(12) United States Patent
Nishida

(10) Patent No.: US 8,927,654 B2
(45) Date of Patent: Jan. 6, 2015

(54) INHIBITOR AND METHOD FOR PREVENTING SILICA-BASED SCALE

(75) Inventor: Ikuko Nishida, Tokyo (JP)

(73) Assignee: Kurita Water Industries Ltd. (JP)

( * ) Notice: Subject to any disclaimer, the term of this patent is extended or adjusted under 35 U.S.C. 154(b) by 150 days.

(21) Appl. No.: 13/144,540

(22) PCT Filed: Jan. 14, 2010

(86) PCT No.: PCT/JP2010/000175
§ 371 (c)(1),
(2), (4) Date: Sep. 29, 2011

(87) PCT Pub. No.: WO2010/082491
PCT Pub. Date: Jul. 22, 2010

(65) Prior Publication Data
US 2012/0022192 A1    Jan. 26, 2012

(30) Foreign Application Priority Data

Jan. 14, 2009    (JP) .................... 2009-005690

(51) Int. Cl.
| C08K 5/49 | (2006.01) |
| C08K 5/52 | (2006.01) |
| C08K 5/5317 | (2006.01) |
| C02F 5/12 | (2006.01) |
| C02F 5/14 | (2006.01) |

(52) U.S. Cl.
CPC ........................................ *C02F 5/14* (2013.01)
USPC ........... 525/180; 524/115; 524/123; 524/124; 524/127; 510/247; 252/175; 210/698; 210/699; 210/700; 210/701

(58) Field of Classification Search
None
See application file for complete search history.

(56) References Cited

U.S. PATENT DOCUMENTS

| 3,900,338 | A | * | 8/1975 | Rumpf et al. ............... 134/22.19 |
| 4,026,815 | A | * | 5/1977 | Kallfass et al. ............... 252/180 |
| 4,409,121 | A | * | 10/1983 | Latos et al. ................ 252/389.2 |
| 4,416,785 | A | * | 11/1983 | Menke et al. .................. 210/699 |
| 4,666,609 | A | * | 5/1987 | Tsuneki et al. ............... 210/701 |
| 5,078,891 | A | * | 1/1992 | Sherwood et al. ............ 210/699 |
| 6,017,994 | A | * | 1/2000 | Carter et al. .................. 524/555 |
| 6,162,391 | A | | 12/2000 | Kowata et al. |
| 7,316,787 | B2 | * | 1/2008 | Hendel et al. ................. 252/180 |
| 2002/0065358 | A1 | * | 5/2002 | Carter et al. .................. 524/555 |

FOREIGN PATENT DOCUMENTS

| EP | 0879794 A1 | | 11/1998 |
| GB | 1208827 A | * | 10/1970 |
| JP | 61-107998 A | | 5/1986 |
| JP | 2-31894 A | | 2/1990 |
| JP | 4-356580 A | | 12/1992 |
| JP | 10-323696 A | | 12/1998 |
| JP | 11-57783 A | | 3/1999 |
| JP | H11138193 A | | 5/1999 |
| JP | 2002-59193 A | | 2/2002 |
| JP | 2002263690 A | * | 9/2002 |
| JP | 2008-36562 A | | 2/2008 |

OTHER PUBLICATIONS

Machine Translation of JP 11-057783A. Mar. 2, 1999.*
Machine Translation of JP2002-263690A. Sep. 17, 2002.*
Breslow, D. S.; Hulse, G. E.; Matlack, A. S. Synthesis of Poly-b-alanine from Acrylamide. A Novel Synthesis of b-Alanine. Journal of the American Chemical Society, 1957, vol. 79, pp. 3760-3763.*
International Search Report for International Application No. PCT/JP2010/000175 mailing date of Feb. 16, 2010 with English translation.
JP Notice of Reasons for Rejection for JP Patent Application No. 2009-005690; Date of Mailing: Jul. 9, 2013; 4 pgs. with English Translation.

* cited by examiner

*Primary Examiner* — Robert C Boyle
*Assistant Examiner* — Stephen Rieth
(74) *Attorney, Agent, or Firm* — Cantor Colburn LLP

(57) ABSTRACT

Provided are a water-treating agent which includes a specific nonionic polymer and a phosphorus compound and can exhibit the ability to inhibit the deposition of silica-based scale under wide ranges of water quality conditions and temperature conditions; and a method of treating water. The inhibitor for silica-based scale includes a nonionic polymer and a phosphorus compound, the nonionic polymer being: a polymer formed by the reaction of an unsaturated double bond and including units derived from at least one monomer selected from the group consisting of (meth)acrylamide, N-substituted (meth)acrylamide and N-vinyl lactam; and/or one or more polymers having an ether group and selected from the group consisting of alkyl alcohol/polyalkylene oxide adducts, aliphatic monocarboxylic acid/polyalkylene oxide adducts, and polyvinyl alcohol/polyalkylene oxide adducts.

3 Claims, No Drawings

US 8,927,654 B2

INHIBITOR AND METHOD FOR PREVENTING SILICA-BASED SCALE

This is a U.S. national stage application of International Application No. PCT/JP2010/000175, filed 14 Jan. 2010. Priority under 35 U.S.C. 119(a) and 35 U.S.C. 365(b) is claimed from Japanese Application No. JP 2009-005690, filed 14 Jan. 2009, the disclosure of which is also incorporated herein by reference.

TECHNICAL FIELD

The present invention relates to an inhibitor for silica-based scale for use in water systems such as cooling water systems, boiler water systems, washing water systems, water systems associated with membrane process, water systems associated with reinjection well of geothermal power plant and the like, and to a method for inhibiting the deposition of silica-based scale.

BACKGROUND ART

As demands for achievement of energy saving and cost saving are accelerated in recent years, saving the amount of water used in a variety of water based systems such as washing water systems, water systems associated with membrane process, and water systems associated with reinjection well of geothermal power plant has been expected. Therefore, techniques for reducing the amount of water blown out from the system, and operating under a highly concentrated condition were developed.

As a result of operation at high concentrations in such water systems, concentrations of silicic acid salts as well as metal salts of calcium, magnesium etc., in water increase, whereby deposition occurs by scaling on the metal surface, particularly the heat transfer surface or the like, that is in contact with water, leading to: a problem of expansion, curling, rupture and the like due to superheating of the steel material of the heat transfer surface, caused by deterioration of heat transfer efficiency; and a problem of occlusion of flow channel of water due to growth of the scale and scale pieces generated by detachment, and the like.

In order to solve these problems, it is necessary to add to the water system a water-treating agent having an action of inhibiting the deposition of scale, thereby inhibiting the adhesion of scale components into the system, and to discharge the components out of the water system by blowing.

Conventionally, as the water-treating agent for preventing silica-based scale, those containing various hydrophilic polymers such as polyacrylamide (Patent Document 1), polyethylene glycol (Patent Document 2), polyvinylformamide (Patent Document 3), terpolymers of acrylic acid, acrylamidemethylpropanesulfonic acid and N-substituted acrylamide (Patent Document 4), and polyvinylpyrrolidone (Patent Document 5) were proposed.

[Patent Document 1] Japanese Unexamined Patent Application, Publication No. S61-107998
[Patent Document 2] Japanese Unexamined Patent Application, Publication No. H02-031894
[Patent Document 3] Japanese Unexamined Patent Application, Publication No. H10-323696
[Patent Document 4] Japanese Unexamined Patent Application, Publication No. H04-356580
[Patent Document 5] Japanese Unexamined Patent Application, Publication No. H11-057783

DISCLOSURE OF THE INVENTION

Problems to be Solved by the Invention

However, although polyacrylamide is found to be effective as long as the concentration of silicic acid in water is low, sufficient effects cannot be achieved when the concentration of silicic acid is high. In the case of polyethylene glycol, effects can be found when the concentration of silicic acid in water is low; however, the effects are not stable since they are likely to be influenced by ions other than the silicate ion. Also, in the case of polyvinylformamide, terpolymers of acrylic acid/acrylamidemethylpropanesulfonic acid/substituted acrylamide, and polyvinylpyrrolidone, superior effects are found in high-temperature regions; however, sufficient effects cannot be achieved in low-temperature ranges, and preventing the generation of scale is difficult in low-temperature ranges particularly when the concentration of silicic acid is high.

The present invention was made in view of the foregoing circumstances, and an object of the present invention is to provide a water-treating agent which can exhibit the ability to inhibit the deposition of silica-based scale under wide ranges of water quality conditions and temperature conditions; and a method of treating water.

Means for Solving the Problems

The present inventors found that the deposition of silica-based scale can be inhibited by adding a specific nonionic polymer and a phosphorus compound to a water system containing silicic acid, irrespective of the concentration of silicic acid, the concentration of metal ions such as a calcium ion and a magnesium ion in water, and temperature conditions. Accordingly, the present invention was completed. Specifically, the present invention provides the following.

The term "inhibiting the deposition of silica-based scale" referred to in the specification and claims of the present application means "inhibiting the generation of scale resulting from the deposition of silica-based substances in a water system", and "inhibiting growth of scale resulting from deposition of silica-based substances on scale constituted with various components already existing in the water system and not limited to the silica-based substances".

A first aspect of the present invention is to provide an inhibitor for silica-based scale, the inhibitor including a nonionic polymer and a phosphorus compound, the nonionic polymer being: a polymer formed by the reaction of an unsaturated double bond and including units derived from at least one monomer selected from the group consisting of (meth)acrylamide, N-substituted (meth)acrylamide and N-vinyl lactam; and/or one or more polymers having an ether group and selected from the group consisting of alkyl alcohol/polyalkylene oxide adducts, aliphatic monocarboxylic acid/polyalkylene oxide adducts, and polyvinyl alcohol/polyalkylene oxide adducts.

A second aspect of the present invention is to provide the inhibitor for silica-based scale according to the first aspect in which the nonionic polymer is a polymer including units derived from N-vinyl lactam.

A third aspect of the present invention is to provide a method for inhibiting the deposition of silica-based scale, the method including adding a nonionic polymer and a phosphorus compound to a water system, the nonionic polymer being: a polymer formed by the reaction of an unsaturated double bond and including units derived from at least one monomer selected from the group consisting of (meth)acrylamide, N-substituted (meth) acrylamide and N-vinyl lactam; and/or one or more polymers having an ether group and selected from the group consisting of alkyl alcohol/polyalkylene oxide adducts, aliphatic monocarboxylic acid/polyalkylene oxide adducts, and polyvinyl alcohol/polyalkylene oxide adducts.

A fourth aspect of the present invention is to provide the method for inhibiting the deposition of silica-based scale according to the third aspect in which the nonionic polymer is a polymer including units derived from N-vinyl lactam.

EFFECTS OF THE INVENTION

According to the present invention, by adding to a water system a phosphorus compound having a chelating effect in addition to a specific nonionic polymer, influences from metal ions such as a calcium ion and a magnesium ion which may affect generation of silica-based scale are less likely to be exerted. Thus, stably preventing the generation of silica-based scale is enabled under wide ranges of water quality conditions and temperature conditions.

PREFERRED MODE FOR CARRYING OUT THE INVENTION

Hereinafter, one embodiment of the present invention is explained, but the present invention is not limited thereto.
[Inhibitor for Silica-Based Scales]

The inhibitor for silica-based scale according to the present invention is added to a water system such as a cooling water system, a boiler water system, a washing water system, a water system associated with membrane process, or a water system associated with reinjection well of geothermal power plant, and exhibits an effect of preventing the generation of silica-based scale. More specifically, the inhibitor for silica-based scale contains a nonionic polymer and a phosphorus compound, the nonionic polymer being: a polymer (hereinafter, may be also referred to as polymer (A)) formed by the reaction of an unsaturated double bond and including units derived from at least one monomer selected from the group consisting of (meth)acrylamide, N-substituted (meth)acrylamide and N-vinyl lactam; and/or one or more polymers (hereinafter, may be also referred to as polymer (B)) having an ether group and selected from the group consisting of alkyl alcohol/polyalkylene oxide adducts, aliphatic monocarboxylic acid/polyalkylene oxide adducts, and polyvinyl alcohol/polyalkylene oxide adducts.

The form of the inhibitor for silica-based scale according to the present invention is not particularly limited as long as the nonionic polymer and the phosphorus compound are homogenously dissolved in the water system, and may be any one of a liquid form (solution form or slurry form), a paste form, and a solid form. As a method for preparing a liquid form preparation, for example, a method in which components of the inhibitor for silica-based scale are dissolved or dispersed in water, a water soluble organic solvent such as methanol or ethanol, or an aqueous solution of a water soluble organic solvent may be exemplified. As a method for preparing a paste form preparation, for example, a method in which a liquid form preparation is prepared and thereafter a well-known thickening agent or the like is added thereto, or a method in which components of the inhibitor for silica-based scale are dispersed or dissolved in a water soluble viscous liquid may be exemplified. As a method for preparing a solid form preparation, a method in which, for example, a water soluble excipient such as lactose, fructose, sucrose, glucose, powder sugar, dextrin, mannitol, erythritol, xylitol, maltitol or sorbitol is used to prepare a granular or tablet form preparation according to a well-known process may be exemplified.

The contents of the nonionic polymer and the phosphorus compound in the inhibitor for silica-based scale of present invention are not particularly limited as long as they fall within the range not to impair the object of the present invention, and may be appropriately adjusted taking into consideration the water quality and the like of the water system.

With respect to the concentration of each component when added to the water system, 1 to 500 mg/L is preferred, and 2 to 200 mg/L is more preferred for the nonionic polymer. For the phosphorus compound, 0.5 to 10 mg/L is preferred, and 1 to 6 mg/L is more preferred in $PO_4$ equivalent.
[Polymer (A)]

Hereinafter, N-substituted (meth)acrylamide and N-vinyl lactam are explained among the monomers for producing the polymer (A) used in the present invention.

N-substituted (meth)acrylamide may be either N-monosubstituted (meth)acrylamide, or N,N-disubstituted (meth) acrylamide. The substituent that substitutes for a nitrogen atom in N-substituted (meth)acrylamide is not particularly limited as long as an object of the present invention is not deteriorated, and in light of appropriate hydrophilicity imparted to the resultant polymer, the substituent is preferably an alkyl group having 1 to 4 carbon atoms, and more preferably a methyl group.

Specific examples of N-substituted (meth)acrylamide used in the present invention include N-methyl(meth)acrylamide, N,N-dimethyl(meth)acrylamide, N-ethyl(meth)acrylamide, N-n-propyl(meth)acrylamide, and N-isopropyl(meth)acrylamide.

In light of superior water solubility of the resulting polymer, N-vinyl lactam used in the present invention is preferably of from three membered to seven membered, and more preferably of 5 to 7 membered. More specifically, N-vinylpyrrolidone, N-vinylpiperidone, and N-vinyl-ε-caprolactam are more preferred since they are readily available.

The polymer (A) used in the present invention may be a copolymerization product of a monomer other than (meth) acrylamide, N-substituted (meth) acrylamide and N-vinyl lactam as long as the object of the present invention is not hampered.

The monomer other than (meth)acrylamide, N-substituted (meth)acrylamide and N-vinyl lactam which may be used for the production of the polymer (A) is exemplified by N-vinyl fatty amides such as N-vinylacetamide, and N-vinylpropionylamide; hydroxyalkyl acrylates such as 2-hydroxyethyl (meth)acrylate, and 3-hydroxypropyl(meth)acrylate; mono (meth)acrylates obtained using polyalkylene glycol or polyalkylene glycol monoalkyl ether having a molecular weight of 100 to 4,000 such a polyethylene glycol mono(meth)acrylate, polypropylene glycol mono(meth)acrylate, and methoxypolyethylene glycol mono(meth)acrylate, and the like. These other monomers may be used alone or in combination of a plurality of the compounds.

The polymer (A) used in the present invention may be produced using one or a plurality of compounds selected from the monomers described above to meet the object with a desired polymerization method selected from among well-known polymerization methods such as solution polymerization, suspension polymerization, and block polymerization.

For example, specific examples of polymerization method in which water is used as a solvent include a method which includes: preparing a solution or suspension of the monomer, followed by adjusting the pH as needed; adding a water soluble polymerization initiator thereto in an inert gas atmosphere and heating to 60 to 100° C., and the like. As the water soluble polymerization initiator, an azo compound such as 2,2'-azobis(2-aminopropane) dihydrochloride, azobis-N,N'-dimethyleneisobutylamidine dihydrochloride or 4,4'-azobis-(4-cyanovaleric acid)-2-sodium, a persulfate such as ammonium persulfate, sodium persulfate or potassium persulfate, a peroxide such as hydrogen peroxide or sodium periodate may be used.

In light of an effect of preventing the generation of silica-based scale, the polymer (A) used in the present invention contains preferably no less than 50% by mole, more preferably no less than 70% by mole, and particularly preferably 100% by mole of units derived from at least one monomer selected from the group consisting of (meth)acrylamide, N-substituted (meth)acrylamide, and N-vinyl lactam relative to total number of units in the polymer.

Moreover, in light of the achievement of a particularly superior effect of inhibiting the deposition of silica-based scale in both the low-temperature range and the high-temperature range, the polymer (A) contains units derived from N-vinyl lactam in an amount of preferably no less than 50% by mole, more preferably no less than 70% by mole, and particularly preferably 100% by mole relative to total number of units in the polymer.

The polymer (A) used in the present invention has a weight average molecular weight of preferably 500 to 100,000, and more preferably 5,000 to 50,000. When the weight average molecular weight is less than 500, the effect of preventing the generation of silica-based scale is insufficient, and a weight average molecular weight exceeding 100,000 is not preferred due to difficulty in handling, and the like, as the viscosity becomes too high. The molecular weight of the polymer (A) used in the present invention may be measured by gel permeation chromatography (GPC) using polyacrylic acid as a standard.

[Polymer (B)]

The polymer (B) used in the present invention is one or more polymers having an ether group and selected from the group consisting of alkyl alcohol/polyalkylene oxide adducts, aliphatic monocarboxylic acid/polyalkylene oxide adducts, and polyvinyl alcohol/polyalkylene oxide adducts. The polymer (B) is preferably an adduct of alkylene oxide having 2 to 12 carbon atoms, and more preferably an adduct of alkylene oxide having 2 to 6 carbon atoms. In light of superior solubility of the polymer (B) in water, the polymer (B) is particularly preferably an adduct of alkylene oxide having 2 to 3 carbon atoms.

Among the examples of the polymer (B), preferable alkyl alcohol/polyalkylene oxide adducts are represented by the following formula (1):

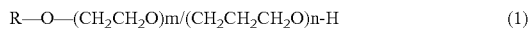

R—O—(CH$_2$CH$_2$O)m/(CH$_2$CH$_2$CH$_2$O)n-H  (1)

wherein, R represents an alkyl group having 1 to 18 carbon atoms, and more preferably 1 to 12 carbon atoms, which may be branched; m and n are each an integer of 0 to 30, and the sum of m and n is 1 to 30; and the ethyleneoxy group and the propyleneoxy group in the formula (1) may be provided by either block addition or random addition.

Among the examples of the polymer (B), preferable aliphatic monocarboxylic acid/polyalkylene oxide adducts are represented by the following formula (2):

R—CO—O—(CH$_2$CH$_2$O)m/(CH$_2$CH$_2$CH$_2$O)n-H  (2)

wherein, R, m and n are defined similarly to those in the formula (1), and the sum of m and n is 1 to 30; and the ethyleneoxy group and the propyleneoxy group in the formula (2) may be provided by either block addition or random addition.

Among the examples of the polymer (B), preferable polyvinyl alcohol/polyalkylene oxide adducts are polymers constituted with the unit represented by the following formula (3):

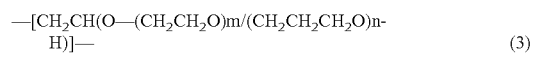

—[CH$_2$CH(O—(CH$_2$CH$_2$O)m/(CH$_2$CH$_2$CH$_2$O)n-H)]—  (3)

wherein, m and n are defined similarly to those in the formula (1), and the sum of m and n is 1 to 30; and the ethyleneoxy group and the propyleneoxy group in the formula (3) may be provided by either block addition or random addition.

The polymer constituted with the unit represented by the formula (3) has a weight average molecular weight of preferably 1,000 to 100,000, and more preferably 5,000 to 20,000.

In the method for producing the polymer (B), although the process for adding alkylene oxide to alkyl alcohol, aliphatic monocarboxylic acid, polyvinyl alcohol or the like is not particularly limited, suitable process may be block addition and/or random addition of alkylene oxide in the presence of a catalyst at a temperature of 30 to 120° C. and at a pressure of from ambient pressure to 0.6 MPa (G).

A well-known catalyst may be used as the catalyst for use in the addition reaction of alkylene oxide. For example, a Lewis acid such as BF$_3$, BCl$_3$, AlCl$_3$, FeCl$_3$ or SnCl$_3$, or a complex thereof (for example, BF$_3$ ether complex, BF$_3$ tetrahydrofuran complex); a protonic acid such as H$_2$SO$_4$ or HClO$_4$; a perchlorate such as KClO$_4$, NaClO$_4$, Ca(ClO$_4$)$_2$, Mg(ClO$_4$)$_2$ or Al(ClO$_4$)$_3$; a hydroxide of an alkali metal or alkaline earth metal such as KOH, NaOH, CsOH or Ca(OH)$_2$; an oxide of an alkali metal or an alkaline earth metal such as K$_2$O, CaO, or BaO; an alkali metal such as Na or K; an alkali metal hydride such as NaH or KH; an amine such as triethylamine or trimethylamine, or the like may be used. Of these, preferred is a BF$_3$ ether complex, a BF$_3$ tetrahydrofuran complex, KOH, NaOH, or CSOH.

(Phosphorus Compound)

As the phosphorus compound for use in the present invention, a polymerized phosphoric acid, a phosphonic acid derivative, a phosphinic acid derivative, or a salt thereof may be used. Specific examples of suitable phosphorus compound used in the present invention include polymerized phosphoric acid or polymerized phosphate such as sodium tripolyphosphate and sodium hexametaphosphate; phosphonic acid derivatives such as nitrilotrimethylene phosphonic acid, hydroxyethylidene diphosphonic acid, ethylenediamine tetramethylene phosphonic acid, phosphonobutane tricarboxylic acid, aminomethylene phosphonate, polyaminopolyether methylene phosphonate, and phosphonopolycarboxylic acid; and phosphinic acid derivatives such as bis(poly-2-carboxyethyl)phosphinic acid.

When the phosphorus compound used in the present invention is a salt, an alkali metal salt such as a sodium salt or a potassium salt is preferred in light of water solubility, and the effect of preventing the generation of silica-based scale.

The inhibitor for silica-based scale of the present invention preferably does not substantially contain orthophosphoric acid and salts thereof. Accordingly, events of contamination of the water system with insoluble salts which account for causes of generation of scale and which are formed by the reaction of a calcium ion, a magnesium ion and the like with a phosphate ion can be prevented. It is to be noted that the phrase "does not substantially contain" includes not only "does not contain at all" but also "contains a slight amount inevitably contaminated", or "contains in an acceptable amount for the purpose of circumvention".

Since the inhibitor for silica-based scale of the present invention thus contains a nonionic polymer and a phosphorus compound in combination, complexity of separate storage and circulation of the nonionic polymer and the phosphorus compound, and the operation of mixing at the site where it is used can be eliminated.

(Others)

The inhibitor for silica-based scale of the present invention may further contain a scale dispersant as long as the object of the present invention is not hampered. The scale dispersant inhibits the adhesion of scale to the water system by allowing the scale to be dispersed. Examples of the scale dispersant include polymers having an acidic group such as a sulfonic acid group or a carboxylic acid group. Specific examples include poly(meth)acrylic acids, polymaleic acids, maleic acid/(meth)acrylic acid copolymers, maleic acid/sulfonic acid group-containing monomer copolymers, (meth)acrylic acid/sulfonic acid group-containing monomer copolymers, (meth)acrylic acid/sulfonic acid group-containing monomer/nonionic group-containing monomer copolymers, and the like.

Herein, examples of the sulfonic acid group-containing monomer include vinylsulfonic acid, allylsulfonic acid, styrenesulfonic acid, isoprenesulfonic acid, 3-allyloxy-2-hydroxypropanesulfonic acid, 2-acrylamide-2-methylpropanesulfonic acid, 2-methacrylamide-2-methylpropanesulfonic acid, methacrylate-4-sulfobutyl, allyloxybenzenesulfonic acid, methallyloxybenzenesulfonic acid, and salts thereof, whereas examples of the nonionic group-containing monomer include alkylamide of (meth)acrylic acid having 1 to 5 carbon atoms, (meth)acryloylmorpholine, 2-hydroxyethyl (meth)acrylate, polyethylene/propylene oxide mono(meth)acrylate having an addition mol number of from 1 to 30, and polyethylene/propylene oxide monovinyl ether having an addition mol number of from 1 to 30.

Furthermore, the inhibitor for silica-based scale of the present invention may contain an anti-corrosion material (neutralizing amines such as cyclohexylamine, diethyl ethanolamine and morpholine, long chain aliphatic amine such as octadecylamine, high metal salts of zinc, aluminum, or nickel etc., azoles such as benzotriazole, tolyltriazole and mercaptobenzothiazole, and hydrazine, etc.), a slime control agent (quaternary ammonium salts such as alkyldimethylbenzylammonium chloride, chlormethyltrithiazoline, chlormethylisothiazoline, methylisothiazoline, or ethylaminoisopropylaminomethylthiatriazine, etc.), an enzyme, a microbicide, a colorant, a flavor, a water soluble organic solvent, a defoaming agent, and the like, as long as the object of the present invention is not hampered.

[Water Treatment Method]

The method for inhibiting the deposition of silica-based scale in a water system according to the present invention includes adding a nonionic polymer and a phosphorus compound, the nonionic polymer being: a polymer formed by the reaction of an unsaturated double bond and including units derived from at least one monomer selected from the group consisting of (meth)acrylamide, N-substituted (meth)acrylamide and N-vinyl lactam; and/or one or more polymers having an ether group and selected from the group consisting of alkyl alcohol/polyalkylene oxide adducts, aliphatic monocarboxylic acid/polyalkylene oxide adducts, and polyvinyl alcohol/polyalkylene oxide adducts to a water system such as a cooling water system, a boiler water system, a washing water system, a water system associated with membrane process, a water system associated with reinjection well of geothermal power plant.

The nonionic polymer and the phosphorus compound may be added to a water system after preparing the inhibitor for silica-based scale as described above, or each component described above in connection with the inhibitor for silica-based scale may be separately added. However, since complexity of separate storage and circulation of the components added to the water system, and the operation of mixing at the site where employed can be eliminated, the method preferably includes adding the nonionic polymer and the phosphorus compound as the inhibitor for silica-based scale.

The site where the nonionic polymer and the phosphorus compound are added to in the water system is not particularly limited as long as almost uniform concentration of the added components can be attained by means of the circulation of water in the water system, and any site in the water system is acceptable, which may be, in general, a site where scale and corrosion should be inhibited, or upstream site thereof.

Details of the components added to the water system are omitted since they are similar to those described above in connection with the inhibitor for silica-based scale.

By allowing a nonionic polymer and a phosphorus compound to be contained in a water system according to the method of the present invention, generation of silica-based scale can be prevented in water systems with a variety of conditions such as cooling water systems, boiler water systems, washing water systems, water systems associated with membrane process, and water systems associated with reinjection well of geothermal power plant.

The nonionic polymer and the phosphorus compound are preferably included in the water system so as to work particularly at a site where silica-based scale is likely to be generated, such as: a heat exchanger, piping and filler in cooling water systems; inner wall surface of tubes in boiler water systems; a membrane surface of water systems associated with membrane process; and a wall surface in a reinjection well of water systems associated with reinjection well of geothermal power plant.

EXAMPLES

Abbreviations used in Examples and Comparative Examples are as described below.

PVP: poly N-vinylpyrrolidone (weight average molecular weight: 9,000)

AAM: polyacrylamide (weight average molecular weight: 1,500)

EO: octadecyl alcohol/polyoxyethylene adduct (8 mol)

PNVF: poly N-vinylformamide (weight average molecular weight: 30,000)

PVA: polyvinylamine (weight average molecular weight: 10,000)

HEDP: hydroxyethylidenediphosphonic acid

PBTC: phosphonobutanetricarboxylic acid

MA: polymaleic acid (weight average molecular weight: 600)

Examples 1 to 6 and Comparative Examples 1 to 8

[Low Temperature Test Liquid]

The acidic compound and the polymer shown in Table 1, and sodium metasilicate, calcium chloride, magnesium sulfate and sodium bicarbonate were used to prepare test liquids with a pH adjusted to 8.8 and having a silica concentration of 250 mg/L, a calcium hardness of 500 mg/L, a magnesium hardness of 500 mg/L and an M alkalinity of 500 mg/L, so as to give the concentrations of the acidic compound and the polymer as shown in Table 1.

[High Temperature Test Liquid]

The acidic compound and the polymer shown in Table 1, and sodium metasilicate, magnesium sulfate and sodium bicarbonate were used to prepare test liquids with a pH adjusted to 9.0 and having a silica concentration of 200 mg/L, a magnesium hardness of 200 mg/L and an M alkalinity of 500 mg/L, so as to give the concentrations of the acidic compound and the polymer as shown in Table 1.

[Low Temperature Test]

The test liquid placed in a plastic vessel was stirred with a magnetic stirrer in a 30° C. water bath, and the silica concentration of the test liquid was determined with a molybdenum blue method when the test was started (0 hrs later), and after a predetermined time period elapsed (48 hrs later and 96 hrs later). The silica concentrations of each Example and Comparative Example after the predetermined time period elapsed are shown in Table 1.

[High Temperature Test]

The test liquid placed in a plastic vessel was stirred with a magnetic stirrer in a 90° C. water bath, and the silica concentration of the test liquid was determined with a molybdenum blue method when the test was started (0 hrs later), and after a predetermined time period elapsed (24 hrs later). The silica concentrations of each Example and Comparative Example after the predetermined time period elapsed are shown in Table 1.

TABLE 1

| Acidic compound | | Polymer | | Silica concentration mg/L | | | | |
|---|---|---|---|---|---|---|---|---|
| | Concentration *1 | | Concentration | Low temperature test | | | High temperature test | |
| Type | mg/L | Type | mg/L | 0 h | 48 h | 96 h | 0 h | 24 h |
| Example | | | | | | | | |
| 1  HEDP | 2 | PVP | 20 | 250 | 254 | 251 | 199 | 167 |
| 2  HEDP | 2 | AAM | 20 | 250 | 253 | 250 | 201 | 153 |
| 3  HEDP | 2 | EO | 20 | 251 | 250 | 253 | 198 | 165 |
| 4  PBTC | 2 | PVP | 20 | 252 | 253 | 251 | 202 | 166 |
| 5  PBTC | 2 | AAM | 20 | 251 | 252 | 250 | 200 | 154 |
| 6  PBTC | 2 | EO | 20 | 250 | 251 | 252 | 200 | 164 |
| Comparative Example | | | | | | | | |
| 1  MA | 20 | — | — | 251 | 230 | 220 | — | — |
| 2  MA | 100 | — | — | — | — | — | 199 | 137 |
| 3  HEDP | 2 | — | — | 250 | 242 | 230 | 199 | 140 |
| 4  PBTC | 2 | — | — | 250 | 243 | 232 | 202 | 146 |
| 5  MA | 20 | PVP | 20 | 252 | 245 | 235 | 200 | 148 |
| 6  PBTC | 2 | MA | 20 | 251 | 242 | 230 | 197 | 150 |
| 7  PBTC | 2 | PNVF | 20 | 250 | 251 | 240 | 199 | 168 |
| 8  PBTC | 2 | PVA | 20 | 249 | 248 | 242 | 199 | 169 |

*1: Concentration in PO₄ equivalent (MA excluded)

From the results of Comparative Example 1 to Comparative Example 4, it was ascertained that when a phosphorus compound alone such as hydroxyethylidenediphosphonic acid or phosphonobutanetricarboxylic acid was used, sufficient effect of inhibiting the deposition of silica-based scale cannot be achieved in both the low temperature and high temperature tests, although the effect of inhibiting the deposition of silica-based scale was somewhat superior to the case in which not a phosphorus compound but polymaleic acid alone was used.

Also, in Examples 1 and 4, by using poly N-vinylpyrrolidone in combination with hydroxyethylidenediphosphonic acid or phosphonobutanetricarboxylic acid, superior effect of inhibiting the deposition of silica-based scale was ascertained. However, in Comparative Example 5 in which poly N-vinylpyrrolidone was used in combination with polymaleic acid, failure in achieving sufficient effect of inhibiting the deposition of silica-based scale was ascertained in both the low temperature and high temperature tests.

Additionally, in Comparative Example 7 and Comparative Example 8 in which poly N-vinylformamide or polyvinylamine was used in combination with phosphonobutanetricarboxylic acid, superior effect of inhibiting the deposition of silica-based scale was ascertained in the high temperature test, whereas the effect of inhibiting the deposition of silica-based scale in the low temperature test was not satisfactory.

From the foregoing, it was proven that superior effect of inhibiting the deposition of silica-based scale can be achieved in both the low temperature and high temperature tests only when a specific nonionic polymer such as polyacrylamide, poly N-vinyl lactam or an alkyl alcohol/ethylene oxide adduct was used in combination with a phosphorus compound such as hydroxyethylidenediphosphonic acid or phosphonobutanetricarboxylic acid.

The invention claimed is:

1. An inhibitor for silica-based scale, the inhibitor comprising a nonionic polymer and a phosphorus compound, the nonionic polymer comprising:
    (a) units derived from N-vinyl lactam, and
    (b) units derived from at least one monomer selected from the group consisting of N-vinyl fatty amide, hydroxyalkyl (meth)acrylate and mono(meth)acrylates obtained using polyalkylene glycol or polyalkylene glycol monoalkyl ether having a molecular weight of 100 to 4,000,
    wherein the nonionic polymer contains no less than 50% by mole of units derived from N-vinyl lactam, and
    wherein the phosphorous compound is at least one selected from the group consisting of polymerized phosphoric acid, nitrilotrimethylene phosphonic acid, hydroxyethylidene diphosphonic acid, and their alkali metal salts.

2. An inhibitor for silica-based scale according to claim 1, wherein the units derived from N-vinyl lactam comprises units derived from N-vinylpyrrolidone.

3. A method for inhibiting the deposition of silica-based scale, the method comprising adding a nonionic polymer and a phosphorus compound to a water system, the nonionic polymer comprising:
    (a) units derived from N-vinyl lactam, and
    (b) units derived from at least one monomer selected from the group consisting of N-vinyl fatty amide, hydroxyalkyl (meth)acrylate and mono(meth)acrylates obtained using polyalkylene glycol or polyalkylene glycol monoalkyl ether having a molecular weight of 100 to 4,000,
    wherein the nonionic polymer contains no less than 50% by mole of units derived from N-vinyl lactam, and
    wherein the phosphorous compound is at least one selected from the group consisting of polymerized phosphoric acid, nitrilotrimethylene phosphonic acid, hydroxyethylidene diphosphonic acid, and their alkali metal salts.

* * * * *